United States Patent
Raucci, Jr.

(10) Patent No.: US 6,405,860 B1
(45) Date of Patent: Jun. 18, 2002

(54) STORAGE CONTAINER FOR COMPACT DISKS

(76) Inventor: Charles Raucci, Jr., 6N327 Dinah Ct., Medinah, IL (US) 60157

( * ) Notice: Subject to any disclaimer, the term of this patent is extended or adjusted under 35 U.S.C. 154(b) by 0 days.

(21) Appl. No.: 09/850,694

(22) Filed: May 7, 2001

(51) Int. Cl.$^7$ ............................................... B65D 85/57
(52) U.S. Cl. ............................ 206/308.1; 206/459.5
(58) Field of Search ............................ 206/303, 307, 206/308.1, 308.2, 310, 387.13, 459.5, 493, 776

(56) References Cited

U.S. PATENT DOCUMENTS

| | | | | |
|---|---|---|---|---|
| 1,413,412 A | * | 4/1922 | Lovell | 206/310 |
| 4,750,618 A | * | 6/1988 | Schubert | 206/310 |
| 5,609,249 A | * | 3/1997 | Cheng | 206/308.1 |
| 5,819,926 A | * | 10/1998 | O'Brien et al. | 206/308.1 |
| 6,059,102 A | * | 5/2000 | Gelardi et al. | 206/310 |
| 6,286,676 B1 | * | 9/2001 | Yatube | 206/493 |

* cited by examiner

*Primary Examiner*—Jim Foster

(57) ABSTRACT

Storage container for holding a compact disk, either in its original commercial package or separately. The container is adapted for molding of a thermoplastic material. The container cover is provided with opposed tabs for engaging the cover flap of the commercial package such that the same is opened when the container is opened. A plurality of hinged tabs are molded on the base of the container which engage a separate disk receiving hub.

2 Claims, 2 Drawing Sheets

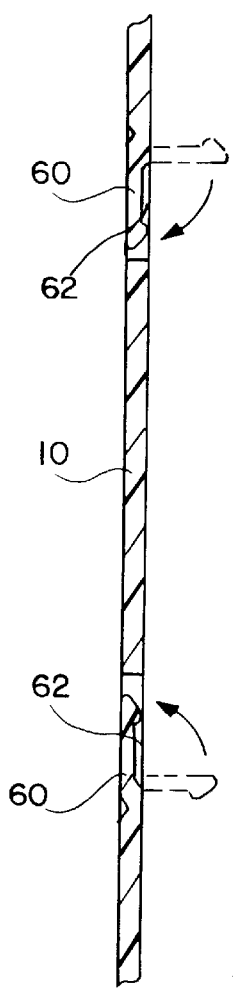
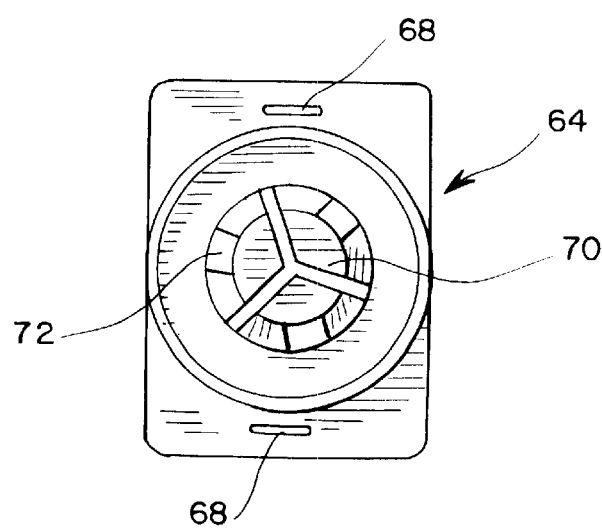
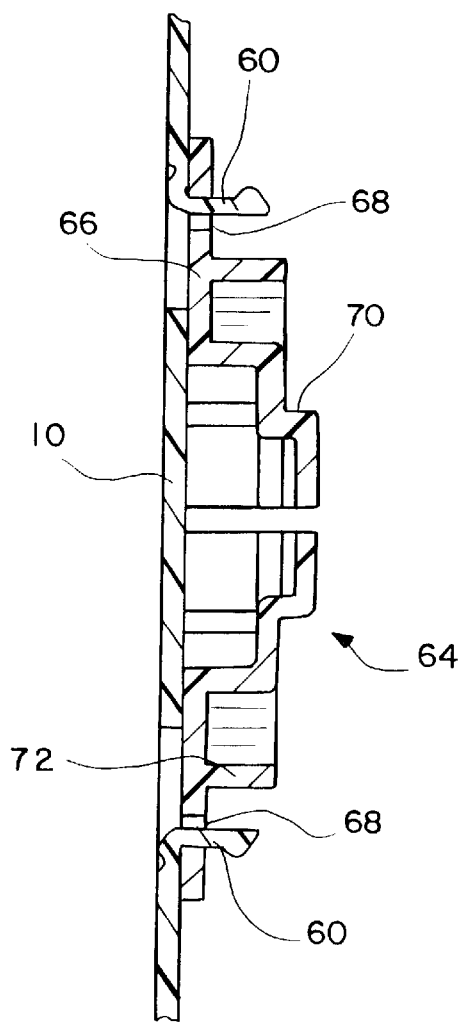

STORAGE CONTAINER FOR COMPACT DISKS

BACKGROUND OF THE INVENTION

1. Field of the Invention

The present invention relates generally to the field of containers and more importantly to an improved storage container for compact audio (CD), video (DVDI or game disks.

2. Description of the Prior Art

Prior to the present invention, the inventor herein developed a molded plastic storage container for commercially packaged compact video disks which is the subject of U.S. Pat. No. 5,829,584, which issued to Charles Raucci, Jr. on Nov. 3, 1998. That container has enjoyed substantial commercial success in the application for which it was designed and represents the most pertinent prior art known to the applicant herein.

The applicant has found that, particularly in the rental market for various entertainment products contained on compact disks; i.e. DVD's, audio CD's, as well as video game CD's, there is a need for a container which will adequately protect a disk separately from its commercial packaging.

OBJECTIVES AND SUMMARY OF THE INVENTION

From the preceding discussion, it will be understood that among the various objectives of the present invention are included the following:

the provision of an improved storage container for compact disks adapted to receive and retain a disk, without any other packaging, and the provision of a container of the above-described character wherein use of the disk receiving feature is optional, without degrading its utility as a container for a digital video disk in its original commercial package.

These and other objectives of the present invention are efficiently achieved by providing an integrally molded structure having a first substantially flat base surface with opposed outwardly stepped end walls and an outwardly stepped side wall extending along one edge between said end walls. A hinged spine extends along the edge of said base surface opposite the side wall. A second substantially flat cover surface hinged to the spine opposite the base surface and having inwardly stepped end walls and an inwardly stepped side wall extending along one edge between the end walls opposite the spine. When closed, the inwardly stepped walls of the cover surface engage the outwardly stepped walls of the base surface. The corners of the side walls may be provided with detents which, when engaged operate to frictionally lock the container in the closed position.

The improvement of the present invention is provided by integrally molding in the flat base surface a plurality of hinged tabs. A disk receiving hub is molded in the surface of a retainer plate having a plurality of slots therethrough adapted to engage the hinged tabs when the same extend inwardly from the base surface of the container. A disk may thus be retained on the hub, within the container and separately from any commercial packaging for the disk.

The foregoing, as well as other objects, features and advantages of the present invention, will become more apparent from the following detailed description taken in conjunction with the various views of the appended drawings.

BRIEF DESCRIPTION OF THE DRAWINGS

FIG. 4 is a partial cross-section view of the base surface of the container of FIG. 3;

FIG. 5 is a perspective view of the retainer plate, in accordance with the present invention;

FIG. 6 is a partial cross-section view of the retainer plate of FIG. 5 assembled with the base surface shown in FIG. 4.

DESCRIPTION OF PREFERRED EMBODIMENT

Figure 1:
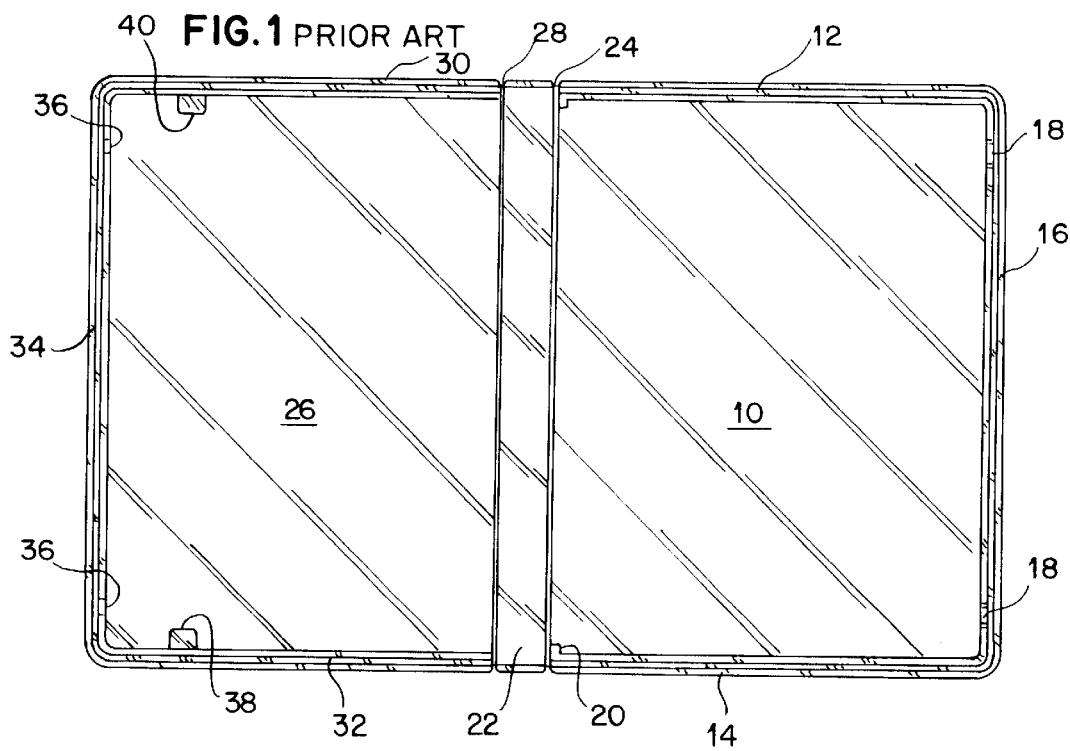
FIG. 1 is a top plan view of an open container, in accordance with the prior art.
Figure 2:
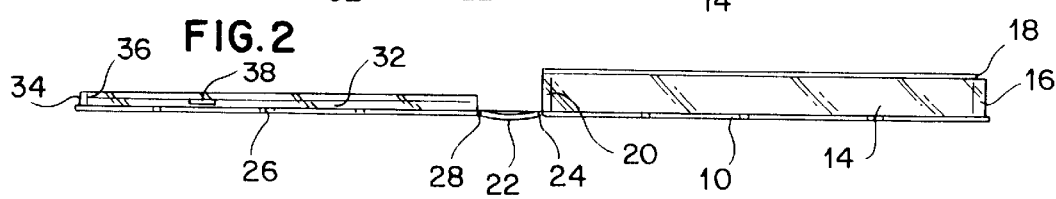
FIG. 2 is an end view of the prior art container shown in FIG. 1.

Turning now to FIGS. 1 and 2, a video disk container in accordance with the prior art is shown in top plan view and end view respectively, wherein like elements are identified by like reference characters. The illustrated container is of the type described in U.S. Pat. No. 5,829,584 to the applicant herein.

A first, substantially flat base surface 10 is provided with opposed end walls 12 and 14 and a side wall 16. The wall depth corresponds to the thickness of the disk retaining base portion of a commercial digital video disk package. The walls 12, 14 and 16 are outwardly stepped which is intended to mean that an inner portion of each is slightly higher than the outer portion thereof.

The side wall 16 is provided adjacent each end thereof with the female portion 18 of a locking detent, the operation of which will be more fully described hereinbelow. Retaining stops 20 are molded in the base surface 10 such that the base portion of a commercial digital video disk package fits snugly within the walls 12 and 14 and against the stops 20.

A spine 22 is integrally molded to the edge of the base surface 10 by means of a so-called "living hinge" 24.

A second, substantially flat cover surface 26 is molded to the opposite edge of the spine 22 also by means of a "living hinge" 28. The cover surface is provided with end walls 30 and 32 and a side wall 34 each of which are inwardly stepped; i.e. the inner portion of each is slightly lower than the outer portion thereof. The side wall 34 is provided adjacent each end thereof with the male portion 36 of a locking detent aligned with the female portion 18 in the side wall 16 on the base surface 10.

The inner surface of each end wall 30 and 32 are provided with retaining tabs 38 and 40 located sufficiently above the cover surface 26 to receive the cardboard cover flap of a commercial digital video disk package.

In the use of the prior art invention, a disk package cover flap is inserted into the container cover 26 beneath the retaining tabs 38 and 40. The base portion of a disk package then is dropped into the container base 10 and is properly located by the retainer stops 20 and frictionally retained in place. When the cover 26 is closed, the inwardly stepped walls 30, 32 and 34 of the cover 26 engage the outwardly stepped walls 12, 14 and 16 of the base 10 to form a substantially dust proof container. The male and female portions, 36 and 18 of the locking detent engage to secure the cover 10 in the closed position.

Figure 3:
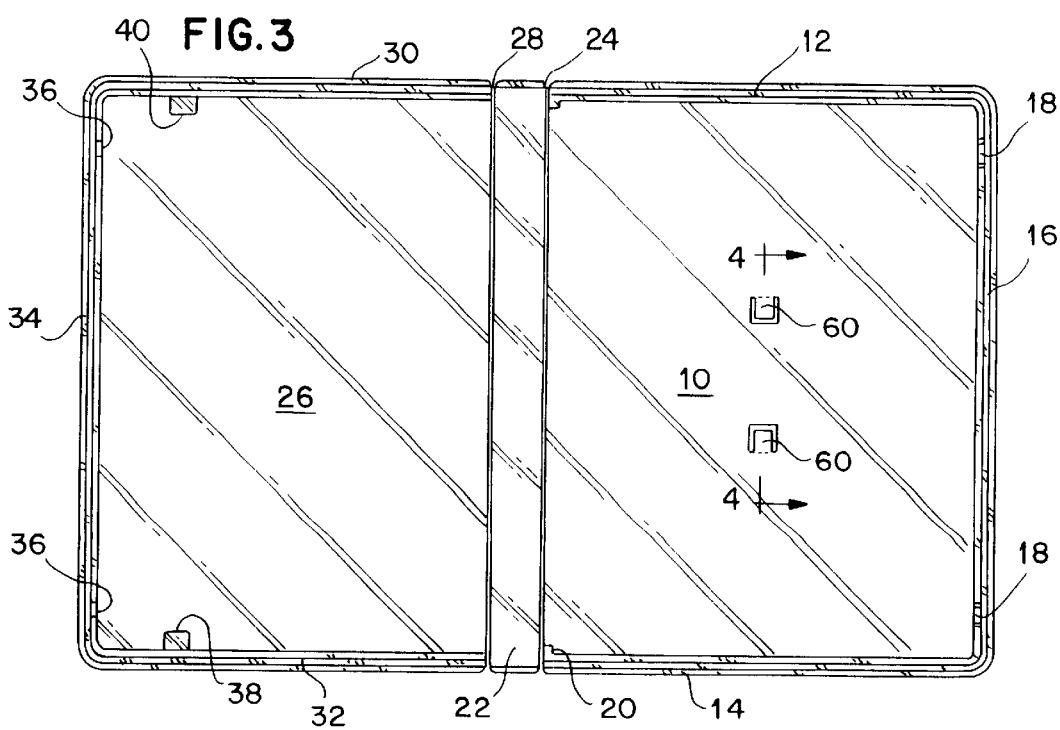
FIG. 3 is a top plan view of the container of FIG. 1 improved, in accordance with the principles of the present invention.

FIG. 3 illustrates the improvement to the prior art container. A plurality (two being shown for illustrative purposes only) of tabs 60 are integrally molded in the flat base surface 10. The tabs may be of any convenient shape, but are hinged along a major dimension to the base surface 10 such that they may be deflected inwardly with respect thereto as shown in the partial cross-section view of FIG. 4. Each tab 60 may be provided with a detent 62 to enhance the engagement between the 10 tabs 60 and the retainer plate described below.

FIG. 5 illustrates in perspective a retainer plate 64 having a substantially flat base 66 provided with a plurality of slots 68 therethrough adapted to engage the tabs shown in FIGS. 3 and 4. An upstanding post or disk hub 70 is integrally molded on the upper surface of the retainer plate 64 and is adapted to frictionally engage the center opening of a compact disk. The post 70 may also be provided with a shoulder 72 at its base to prevent contact between the recorded surface of the compact disk and the retainer plate 64.

FIG. 6 shows the retainer plate 64 assembled with the tabs 60 on the base surface 10 of the container. The retainer plate 64 is simply oriented to register the slots 68 with the tabs 60 and pressed down until the detents 62 of the tabs 60 engage the retainer plate. The container thus configured may receive and retain a compact disk without any other packaging. When, as preferred, the container is formed of a substantially transparent thermoplastic material any graphic or text material printed on the disk is readily visible without opening the container.

It will be understood that if the tabs 60 are left in their originally molded position flush with the flat base surface 10, the container may still be used for its original purpose of containing commercially packaged compact video disks.

From the foregoing description, it will be understood that the applicant has provided a new and improved storage container for commercially packaged digital video disks which also has the capacity to hold compact disks, without the use of any other packaging, whereby the objectives set forth hereinabove are efficiently achieved. Since certain changes and modifications of the above-described invention will occur to those skilled in the art without departure from the scope of the invention, it is intended that all matter contained in the preceding description or shown in the appended drawings shall be interpreted as illustrative and not in a limiting sense.

Having described what is new and novel and desired to secure by Letters Patent, what is claimed is:

1. An improved storage container for a compact disk, said container of the type, having a first substantially flat base surface; opposed end walls and a side wall disposed proximate the outer edge of said base surface, each of a depth at least equal to the thickness of the disk retaining portion of a commercial compact disk package and having an inner portion higher than an outer portion thereof; a spine member hingedly molded to the edge of said base surface opposite said side wall; a second substantially flat cover surface hingedly molded to the edge of said spine member opposite said base surface; opposed end walls and a side wall disposed proximate the outer edge of said cover surface having an outer portion higher than an inner portion thereof; and wherein said improvement comprises
  a plurality of tabs integrally molded in said flat base surface and hinged along one dimension such as to be inwardly deflectable with respect to said flat base surface;
  a separate retainer plate having a plurality of slots therethrough adapted to engage and retain said tabs and an upstanding disk hub formed in the surface of said retainer plate adapted to receive and frictionally engage the center opening: of a compact disk
  whereby rotation of said cover surface toward and around said spine member causes the walls on said base and cover surfaces to engage one another to thereby provide a closed container.

2. The container as defined in claim 1 wherein
said container is formed of a substantially transparent thermoplastic material such that any graphic material displayed on the surface of the compact disk is visible through said container.

\* \* \* \* \*